United States Patent
Ueda et al.

(10) Patent No.: US 12,502,833 B2
(45) Date of Patent: Dec. 23, 2025

(54) 3D PRINTING SYSTEM

(71) Applicant: NISSAN NORTH AMERICA, INC., Franklin, TN (US)

(72) Inventors: Naoki Ueda, Novi, MI (US); Nanzhu Zhao, Novi, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 203 days.

(21) Appl. No.: 18/331,136

(22) Filed: Jun. 7, 2023

(65) Prior Publication Data

US 2024/0408823 A1    Dec. 12, 2024

(51) Int. Cl.
| | |
|---|---|
| *B29C 64/30* | (2017.01) |
| *B29C 64/245* | (2017.01) |
| *B33Y 30/00* | (2015.01) |
| *B33Y 40/00* | (2020.01) |

(52) U.S. Cl.
CPC ............ *B29C 64/30* (2017.08); *B29C 64/245* (2017.08); *B33Y 30/00* (2014.12); *B33Y 40/00* (2014.12)

(58) Field of Classification Search
CPC ... B29C 64/124; B29C 64/129; B29C 64/135; B29C 64/30; B29C 64/386; B29C 64/393; B33Y 10/00; B33Y 30/00; B33Y 40/00; B33Y 50/00; B33Y 50/02
See application file for complete search history.

(56) References Cited

U.S. PATENT DOCUMENTS

| | | | |
|---|---|---|---|
| 10,399,272 B2 | 9/2019 | Linnell et al. | |
| 2017/0297264 A1* | 10/2017 | Linnell | ................. B29C 64/379 |
| 2022/0168813 A1* | 6/2022 | Dardis | ................. B23K 26/342 |
| 2023/0339181 A1* | 10/2023 | Habibi | .................. B33Y 10/00 |

FOREIGN PATENT DOCUMENTS

| | | | | |
|---|---|---|---|---|
| CN | 107263861 A | 10/2017 | | |
| CN | 107791512 A | 3/2018 | | |
| CN | 208558304 U | 3/2019 | | |
| CN | 116160684 A | * 5/2023 | ........... | B29C 64/386 |
| KR | 101593488 B1 | 2/2016 | | |
| KR | 20190059099 A | 5/2019 | | |
| KR | 102060537 B1 | 12/2019 | | |

\* cited by examiner

*Primary Examiner* — Jamel M Nelson
(74) *Attorney, Agent, or Firm* — Global IP Counselors, LLP

(57) ABSTRACT

A 3D printing system includes a tank, a rigid base, a transducer an electronic controller. The tank contains a liquid photopolymer resin. The tank includes an optically transparent window through which light is configured to pass. A printed substrate is produced on the rigid base from the liquid photopolymer resin as the rigid base moves with respect to the tank. The transducer is movably supported with respect to the tank. The transducer is configured to emit a vibration wave toward the optically transparent window. The electronic controller is programmed to control a position between the transducer and the printed substrate.

18 Claims, 6 Drawing Sheets

3D PRINTING SYSTEM

BACKGROUND

Technical Field

The present disclosure generally relates to a 3D printing system. More specifically, the present disclosure relates to a 3D printing system having at least one movable transducer.

Background Information 3D (three-dimensional) printing is the construction of a three-dimensional object from a digital file, such as a CAD model or a digital 3D model. A conventional additive manufacturing process creates the object by successively adding layers one at a time until the object is complete. One type of additive manufacturing process is vat polymerization, which includes stereolithography (SLA) and digital light processing (DLP) processes.

SUMMARY

In view of the state of the known technology, one aspect of the present disclosure is to provide a 3D printing system comprising a tank, a rigid base, a transducer an electronic controller. The tank contains a liquid photopolymer resin. The tank includes an optically transparent window through which light is configured to pass. A printed substrate is produced on the rigid base from the liquid photopolymer resin as the rigid base moves with respect to the tank. The transducer is movably supported with respect to the tank. The transducer is configured to emit a vibration wave toward the optically transparent window. The electronic controller is programmed to control a position between the transducer and the printed substrate.

BRIEF DESCRIPTION OF THE DRAWINGS

Referring now to the attached drawings which form a part of this original disclosure.

DETAILED DESCRIPTION OF EMBODIMENTS

Figure 1:
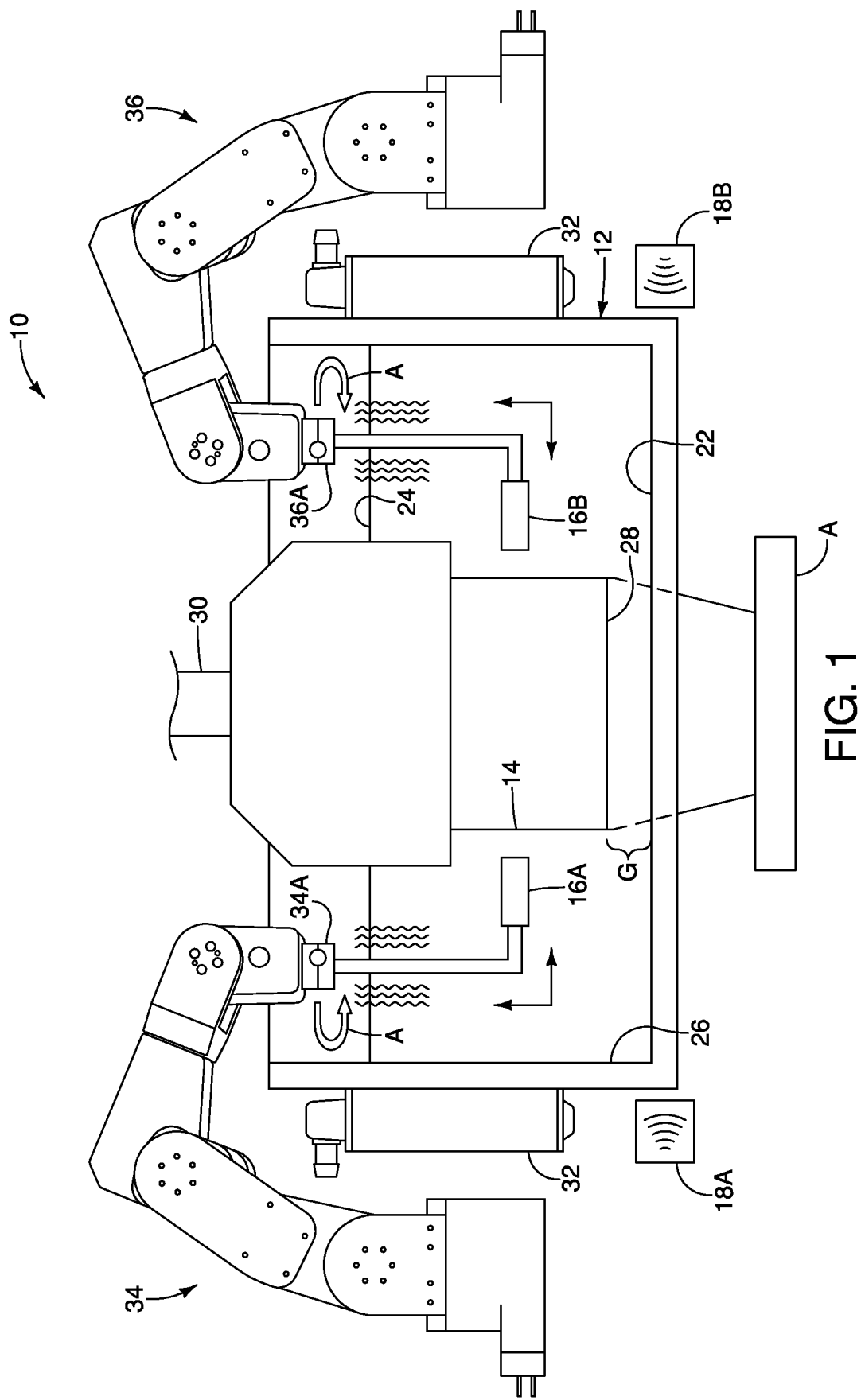
FIG. 1 is a schematic diagram of the hardware components of a 3D printing system in accordance with an illustrated embodiment.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

A 3D printing system 10 comprises a tank 12, a rigid base 14 (or a build plate) and a transducer 16A movably that is supported with respect to the tank 12. In the illustrated embodiment, the transducer 16A is a first transducer 16A and the 3D printing system 10 further comprises a second transducer 16B that is also movably supported with respect to the tank 12. The 3D printing system 10 further comprises an electronic controller ECU programmed to control a position of the first and second transducers 16A and 16B. The 3D printing system 10 further comprises a detector 18A configured to detect the position of the first and second transducers 16A and 16B with respect to a printed substrate 20 as a position between the printed substrate 20 and a bottom wall 22 of the tank 12 changes during printing.

The tank 12 contains a liquid photopolymer resin 24. The tank 12 has the bottom wall 22 and one or more sidewalls extending upwardly from the bottom wall 22. The bottom wall 22 is preferably transparent such that the light emitted from a light source A can pass through the bottom wall 22. Therefore, the bottom wall 22 of the tank 12 is a transparent window through which light is configured to pass. The entirety of the bottom wall 22 can be transparent, or a portion of the bottom wall 22 can be transparent. The transparent portion of the bottom wall 22 constitutes an optically transparent window through which the emitted light can pass. The tank 12 can be any suitable shape to hold the liquid polymer resin 24 therein, such as rectangular or circular.

Figure 3:
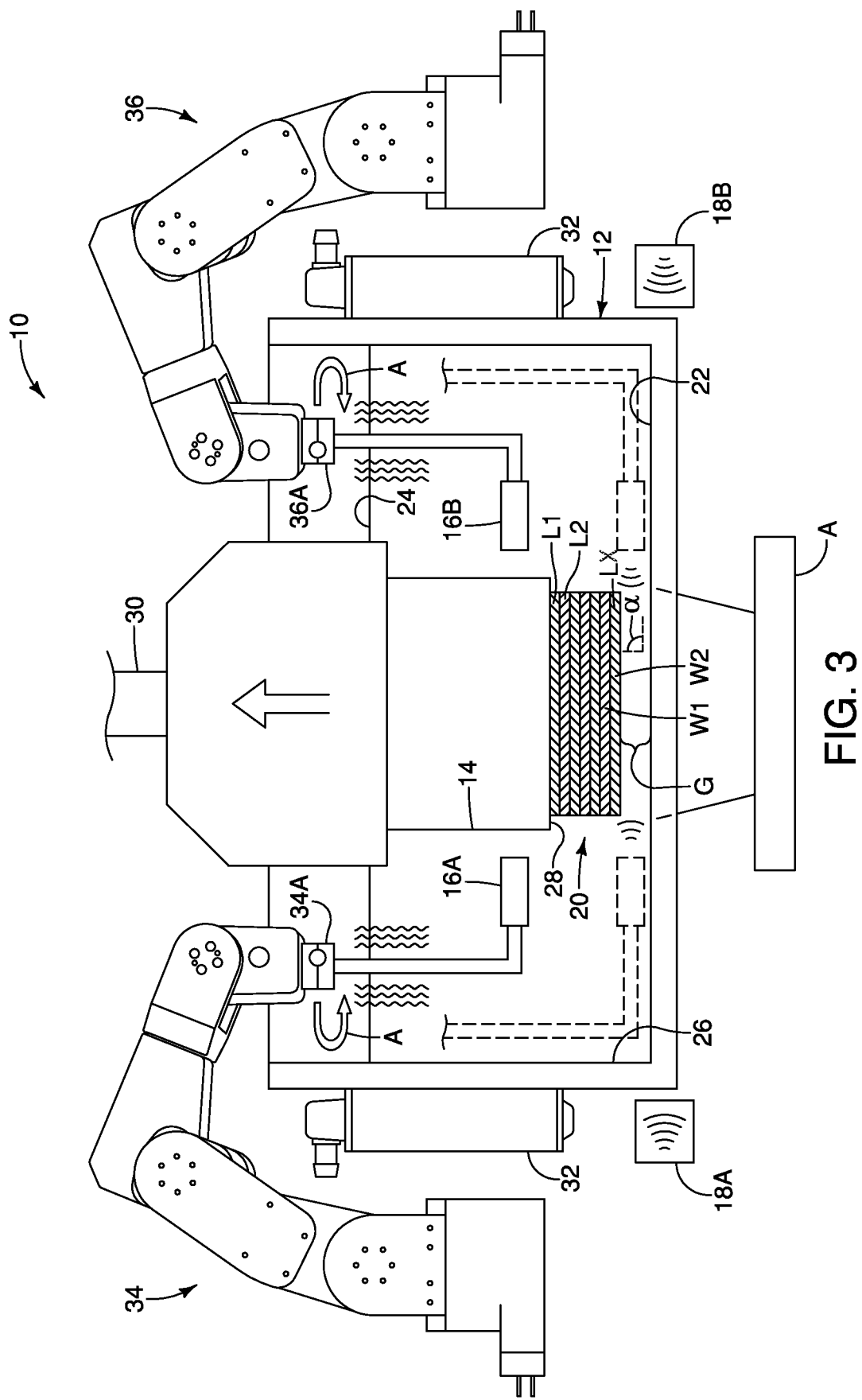
FIG. 3 is a schematic diagram of the 3D printing system of FIG. 1 but with transducers being portrayed as movable towards a printed substrate.
Figure 4:
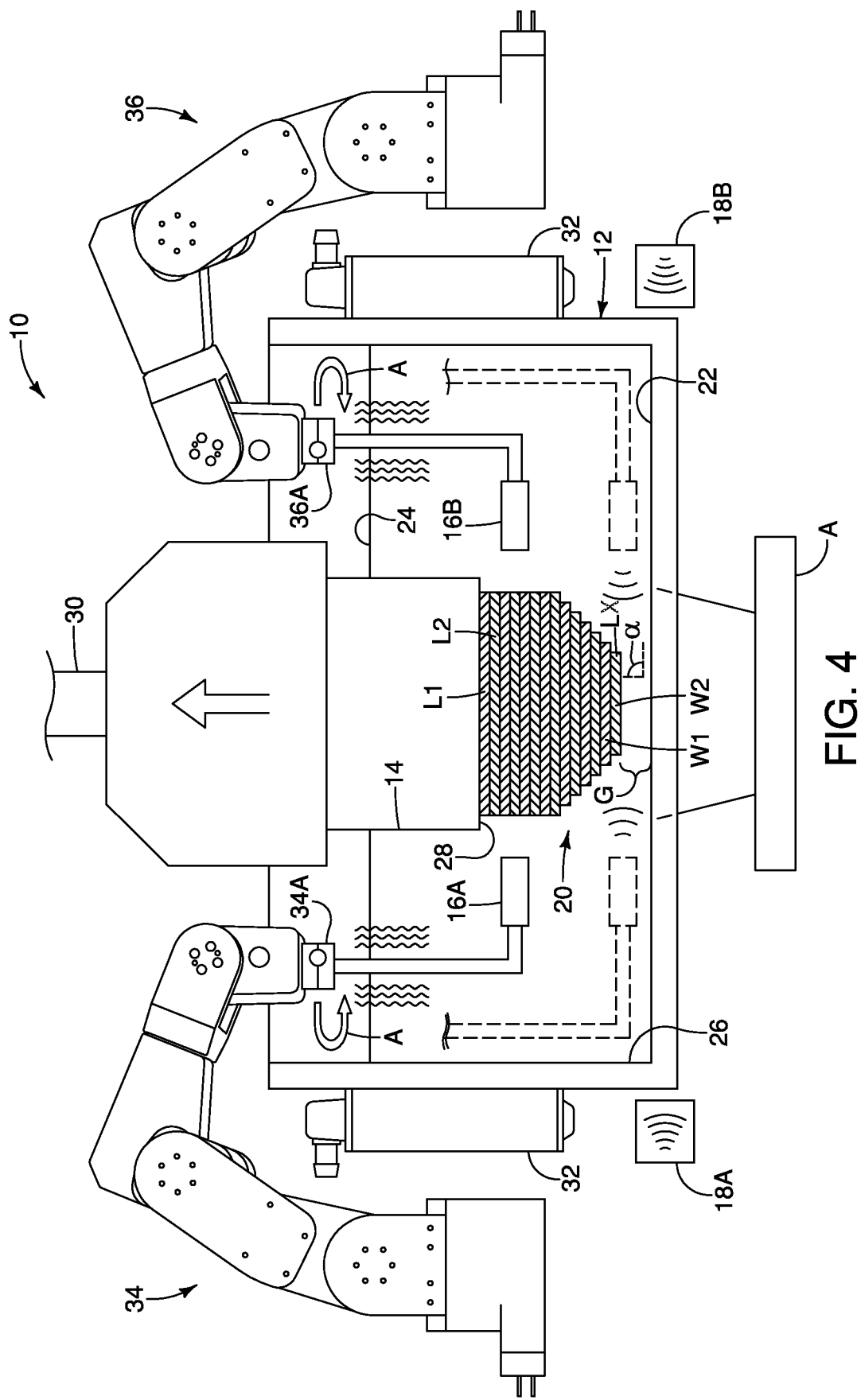
FIG. 4 is a schematic diagram of the 3D printing system of FIG. 1 but with transducers being portrayed as movable towards the printed substrate as the printing process progresses.

As shown in FIGS. 1, 3 and 4, the printed substrate 20 is produced on the rigid base 14 from the liquid photopolymer resin 24 as the rigid base 14 moves with respect to the tank 12. As shown in FIGS. 3 and 4, the printed substrate 20 is illustrated as having a plurality of layers L1, L2 .... LX as the 3D printing process progresses with each layer of the printed substrate 20 being printed from the rigid base 14 on a side closer to the bottom wall 22.

The rigid base 14, or build platform, build plate or print bed provides the surface on which the printed substrate 20 is printed. That is, the rigid base 14 has a print surface on which the printed substrate 20 is configured to be printed. As shown, the 3D printing system 10 further includes a control arm 30 connected to the rigid base 14. The control arm 30 is connected to the rigid base 14 to move the rigid base 14 relative to the tank 12. The print surface is preferably a planar surface. The rigid base 14 can be made of any suitable material, such as plastic, such as polyactic acid (PLA), or glass.

The control arm 30 is connected to the rigid base 14 to control movement and positioning of the rigid base 14 during the printing process. The control arm 30 is connected to the rigid base 14 to move the rigid base 14 relative to the tank 12. The control arm 30 preferably has six degrees of freedom, such that the rigid base 14 can move through a curvilinear path to more accurately print the printed substrate 20. The control arm 30 is preferably a robotic arm having six degrees of freedom. The six degrees of freedom are movements along the three axes (i.e., the X, Y and Z axes), and rotation about each of the three axes (i.e., pitch, roll and yaw).

The liquid polymer resin 24 is selectively cured by light-activated polymerization, such as by photopolymerization, which preferably uses visible or UV light, although light having any suitable wavelength can be used, to form in situ cross-linked polymer structures. The light source A is configured to emit light to the tank 12 to form the printed substrate 20 on the rigid base 14. The liquid polymer resin 24 preferably includes monomer and oligomer molecules that are converted to solid polymers during photopolymerization when the light emitted by the light source A is guided through the transparent portion, or the optically transparent window, of the bottom wall 22 of the tank 12.

The light source A emits light to cure the liquid polymer resin 24 in the tank 12, as shown in FIGS. 1, 3 and 4. The light source A preferably emits UV light having a wavelength between approximately 10 and 400 nanometers, inclusive. Preferably, the emitted UV light has a wavelength between approximately 380 and 400 nanometers, inclusive. Light having any suitable wavelength can be used, such as, but not limited to, UV, visible and infrared light.

The liquid polymer resin 24 includes a photoinitiator that initiates photopolymerization in the tank 12 when the light emitted by the light source A passes through the optically transparent window of the bottom wall 22 of the tank 12. The photoinitiator absorbs light energy having a predetermined wavelength from the light emitted by the light source A to the tank 12. The photoinitiator is preferably selected based on the wavelength of the light emitted by the light source A.

As shown in FIGS. 3 and 4, the printed substrate 20 is formed on the print surface of the rigid base 14. The printed substrate 20 can be based on a model supplied to the electronic controller ECU that controls the 3D printing process. The light emitted from the light source A is guided to the tank 12 to cure the liquid polymer resin 24 on the surface of the rigid base 14 to form a first layer L1 of the printed substrate 20. The control arm 30 is connected to the rigid base 14 to move the rigid base 14 relative to the tank 12 in a direction away from the optically transparent window of the bottom wall 22. The rigid base 14 is moved a distance approximately equal to a thickness of the formed layer. The light is emitted from the light source A to cure the liquid polymer resin 24 in the tank 12 to form a second layer L1 on the first layer L2. This process is repeated until the entire printed substrate 20 is printed. When the printing is complete, the printed substrate 20 can be removed from the print surface of the rigid base 14.

The first transducer 16A is connected to the tank 12 and is configured to emit a first vibration wave towards the printed substrate 20. As shown in FIGS. 1, 3 and 4, a second transducer 16B is connected to the tank 12 and is configured to emit a second vibration wave. The second transducer 16B is disposed diametrically opposite the first transducer 16A. The second transducer 16B is preferably disposed at approximately the same height relative to the bottom wall 22 of the tank 12 as the first transducer 16A in order to emit equal and opposite vibration waves with respect to the first vibration wave. In the illustrated embodiment, the vibration waves W1 and W2 can include any type of vibration wave, including acoustic or ultrasonic waves.

The 3D printing system 10 can further include one or more heat exchangers 32 connected to the tank 12. The heat exchanger is configured to cool the liquid polymer resin 24. As shown, the 3D printing system 10 includes a pair of first and second heat exchangers 32. The first and second heat exchangers 32 can be any suitable heat exchangers 32. The first and second heat exchangers 32 can be passive or active heat exchangers 32 that facilitate extracting and removing heat from the liquid polymer resin 24 in the tank 12 generated by the emitted light and the photopolymerization process of printing the printed object. The first and second heat exchangers 32 can include a peltier module to facilitate removing heat from the liquid polymer resin 24.

It has been known that for conventional 3D printing systems, a gap G between the built plate and the transparent window can be very small such that the channel for resin 24 flow is small, as seen in FIG. 1. Therefore, the resin 24 is provided as having high viscosity in order to be less mobile due to the increase in molecular weight. But increasing viscosity of the resin 24 flow can result in decrease of printing speed. Therefore, the 3D printing system 10 is provided having at least one movable transducer that can apply a vibration wave or an acoustic wave towards the printed substrate 20 to pull the printed substrate 20 from the resin 24 as printing progresses and the resin 24 becomes more viscous. Furthermore, as the resin 24 becomes more viscous during printing, more bubbles can be trapped in the gap G, which can cause defects in the printed subject matter by causing the UV light to become deflected.

Therefore, in the illustrated embodiment, the 3D printing system 10 is provided with at least one transducer that is movably supported with respect to the tank 12 to emit a vibration wave toward the optically transparent window. As discussed, the 3D printing system 10 comprises the first and second transducers 16A and 16B that are movably supported with respect to the tank 12.

In the illustrated embodiment, the first and second transducers 16A and 16B are preferably provided as robotic arms 34 and 36 that are supported outside of the tank 12 such that first and second transducers 16A and 16B are movable with respect to the tank 12. Therefore, the 3D printing system 10 includes first and second robotic arms 34 and 36 controlling the first and second transducers 16A and 16B respectively. The first and second transducers 16A and 16B are provided for controlled local application of vibration waves W1 and W2 towards the transparent window such that the application of the vibration waves W1 and W2 produced by the first and second transducers 16A and 16B are more focused and energy efficient.

Here the first and second transducers 16A and 16B emit vibration waves W1 and W2 travel through the inert liquid layer and the liquid polymer resin 24 to generate a shear vibration at the interface between the inert liquid layer and the liquid polymer resin 24 to further facilitate resin 24 flow. The shear vibration further reduces the interfacial friction force at the interface between the inert liquid layer and the liquid polymer resin 24 to facilitate resin 24 flow.

The layer of the inert liquid is inert to the photopolymerization reaction occurring during the 3D printing process. The first and second transducers 16A and 16B control the vibration/acoustic energy flow to guide the direction flow of the liquid polymer resin 24. The first and second transducers 16A and 16B further facilitate controlling the resin 24 flow to improve the speed of the 3D printing process. The heat exchangers 32 can improve controlling the resin 24 flow by removing heat from the resin 24.

Figure 2:
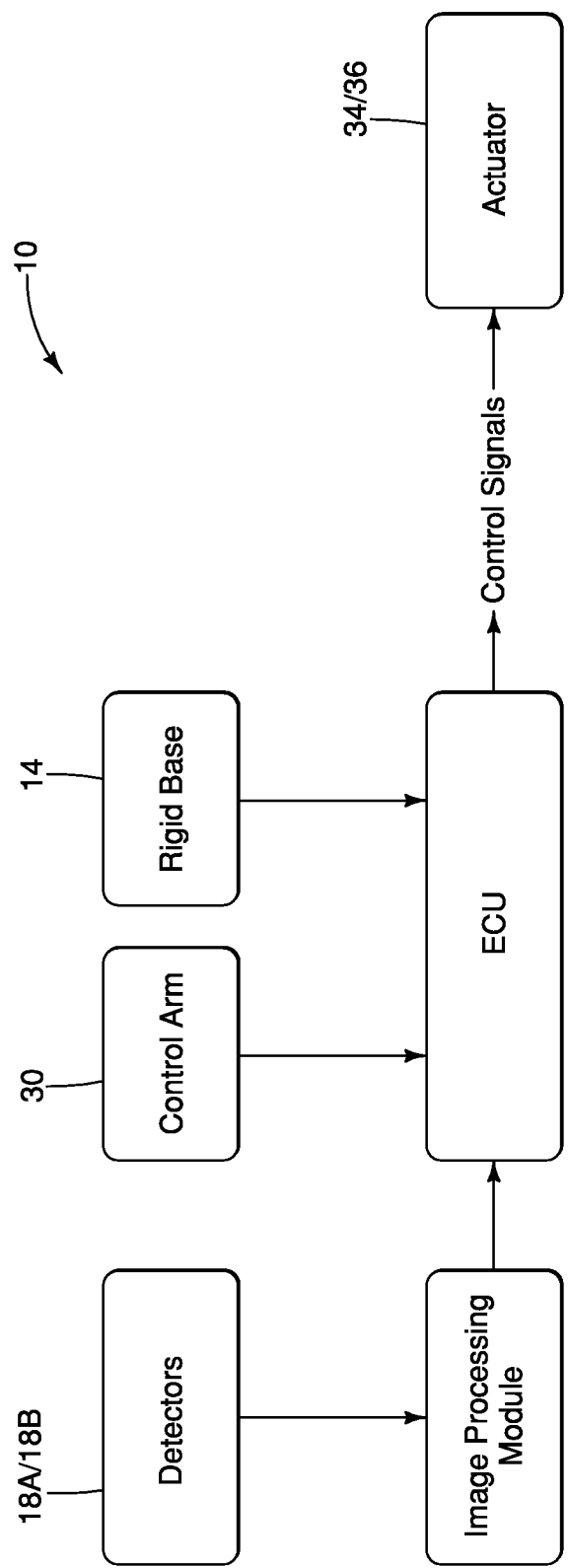
FIG. 2 is a block diagram of the software components of the 3D printing system.

As shown in FIGS. 1 and 2, in the illustrated embodiment, the 3D printing system 10 includes one or more detectors 18A and 18B that can detect the position of the first and second transducers 16A and 16B with respect to the tank 12. While a pair of detectors 18A and 18B that are positioned on opposite sides of the tank 12 are shown, for simplicity, only a single detector 18A will be described herein as the detectors 18A and 18B are identical. As stated, the electronic controller ECU is programmed to control a position between the transducers and the printed substrate 20. The electronic controller ECU can control the position based on information detected by the detector 18A.

The detector 18A can include a laser (radar or infrared) that measures a distance between the transducers and the printed substrate 20. The detector 18A can continuously measure the distance as the printing process progresses and the printed substrate 20 grows over time. The detector 18A can alternatively be an image sensor such as a camera that captures an image of the transducer with respect to the printed substrate 20 during printing.

Preferably, the detector 18A detects an angular position between the transducer with respect to a printed substrate 20 layer that is closest to a bottom wall 22. The detector 18A can also detect a distance between the first and second transducers 16A and 16B and the printed substrate 20 layer that is closest to the bottom wall 22. In the simplest embodiment, the 3D printing system 10 can be provided without a detector 18A. Rather, referring to FIG. 2, the electronic controller ECU can be in communication with components of the tank 12, such as the rigid base 14 and/or the control arm 30. That is, the electronic controller ECU can receive information regarding a height and/or position of the rigid base 14 and/or the control arm 30 to deduce the location of the printed substrate 20 with respect to the bottom wall 22 of the tank 12. The electronic controller ECU can be programmed to automatically determine the location of the rigid base 14 and/or the control arm 30 at preset intervals to determine whether the positions of the first and second transducers 16A and 16B need to be adjusted.

In the illustrated embodiment, the electronic controller ECU can include a processor of the 3D printing system 10, as well as a processor of an external device (for example, a laptop computer, a desktop computer, a tablet computer and a smartphone) that receives an input of command and transmits it to the 3D printing system 10 and an external server connected to each processor via a network. If the detector 18A is a camera, the electronic controller ECU preferably further includes an image processing module that processes the images captured by the camera, as seen in FIG. 2.

The electronic controller ECU can further include substitute hardware devices (e.g., without limitation, a tablet, a smartphone, a programmable logic controller (PLC), or a computer numerical control (CNC) machine controller). That is, the electronic controller ECU can include all of necessary hardware/software participating in the process of controlling the ultrasound transducer according to the input (an automatic input based on 3D modeling information of the object or the user's manual input). In the illustrated embodiment, electronic controller ECU is in communication with a respective actuator 34A and 36A of the first and second transducers 16A and 16B (a robotic arm, a motor, or an ultrasonic vibrator). The actuators 34A and 36A can control an angular position of the first and second transducers 16A and 16B, as well as vertical and lateral movements of the first and second transducers 16A and 16B. The robotic arms 34 and 36 of the first and second transducers 16A and 16B can also be considered the actuators. Preferably, the electronic controller ECU is indirectly or wirelessly connected to the hardware components of the 3D printing system 10.

As stated, the first and second transducers 16A and 16B are provided as being movable to get close to the most recently printed substrate 20 layer (the substrate layer that is closest to the bottom wall 22 of the tank 12) as possible in order to generate targeted and localized vibration to that area. Therefore, the electronic controller ECU is programmed to control the position of the first and second transducers 16A and 16B based on a location and shape of the printed substrate layer LX that is closest to the bottom wall 22 of the tank 12. If the most recently printed substrate layer LX is less wide, more wide, thinner or thicker, than the previously precent layer, then the electronic controller ECU can adjust the first and second transducers 16A and 16B accordingly.

In the illustrated embodiment, the electronic controller ECU is programmed to maintain a predetermined angular position between the transducers and the printed substrate 20 layer that is closest to the bottom wall 22. In the illustrated embodiment, the predetermined angular position between the transducers and the printed substrate 20 layer that is closest to the bottom wall 22 is 90 degrees. That is, the electronic controller ECU preferably controls the first and second transducers 16A and 16B to apply vibration waves at a 90 degree angle with respect to the printed substrate 20 that is closest to the bottom wall 22 of the tank 12. As seen in FIGS. 3 and 4, the transducers 16A and 16B generate vibration waves in a direction that is perpendicular to (at a 90 degree angle as depicted by angle $\alpha$) with respect to the layer LX.

In addition, the electronic controller ECU is programmed to maintain a predetermined distance between the transducers and the printed substrate 20 layer that is closest to the bottom wall 22. In the illustrated embodiment, the predetermined distance between the transducers and the printed substrate 20 layer that is closest to the bottom wall 22 is between 100 microns to 55 millimeters. More preferably, the predetermined distance between the transducers and the printed substrate layer LX that is closest to the bottom wall 22 is between 1 and 3 millimeters.

The electronic controller ECU is connected to the first and second transducers 16A and 16B to wiredly or wirelessly to control the setting values of target focal point, focused intensity and acoustic frequency of the first and second transducers 16A and 16B. Further, the electronic controller ECU can preferably control the printing precision by adjusting the frequency of vibration waves outputted from the transducers or the size of the target focal point.

As shown in FIGS. 1 to 4, the transducer can adjust the vertical, lateral as well as the angular movements of the first and second transducers 16A and 16B by controlling the robotic arms 34 and 36 of the first and second transducers 16A and 16B in accordance with the predetermined angular position and the predetermined distance. The predetermined angular position and the predetermined distance can all be factory settings that are pre-stored in memory or storage of the electronic controller ECU.

The memory is any computer storage device (transitory or non-transitory computer-readable medium) with the sole exception of a transitory propagating signal. For example, the memory can include nonvolatile memory and volatile memory, and can includes an internal memory, or other type of memory devices such as a ROM (Read Only Memory) device, a RAM (Random Access Memory) device, a hard disk, a flash drive, etc.

Figure 5:
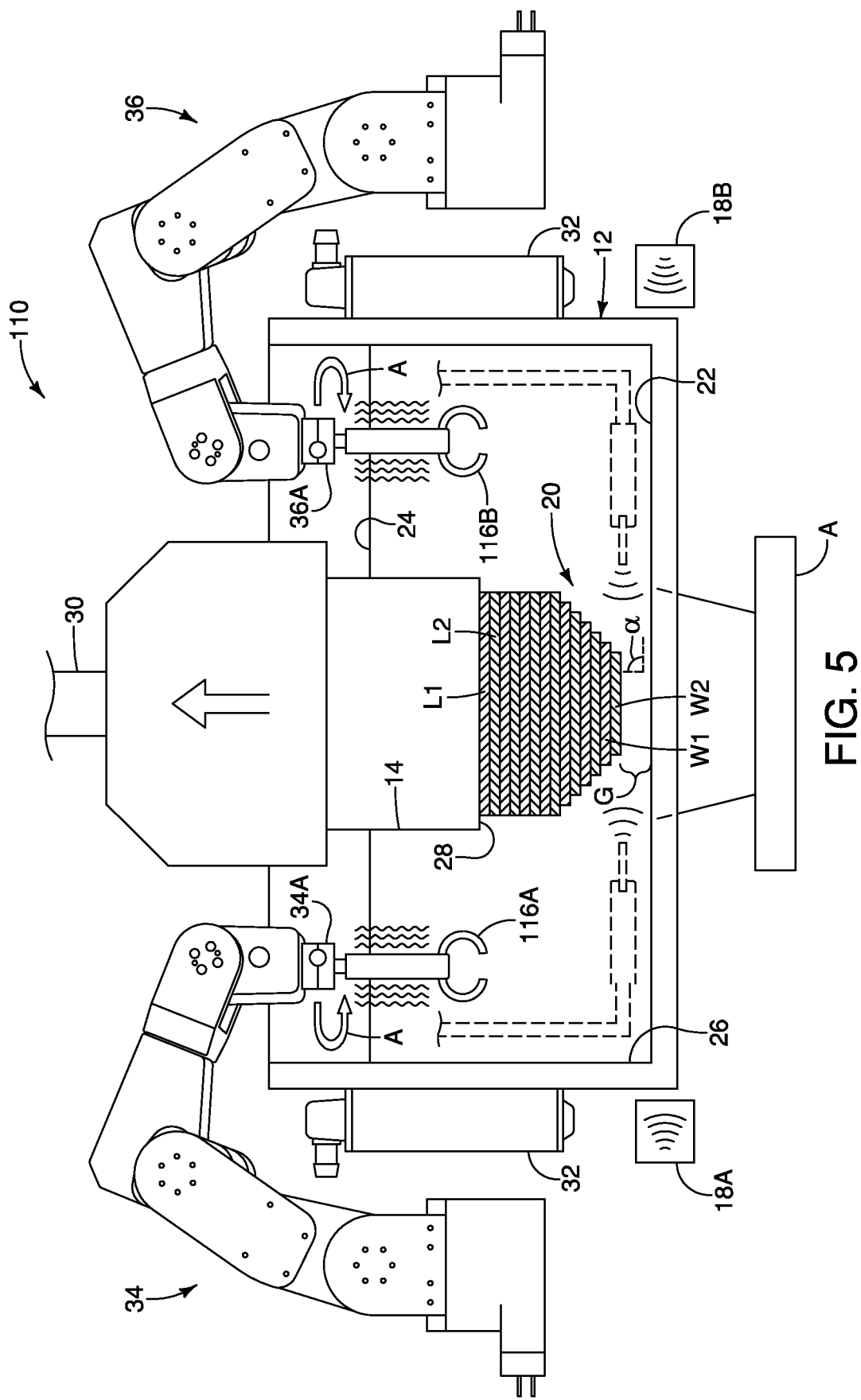
FIG. 5 is a schematic diagram of the hardware components of a modified 3D printing system.
Figure 6:
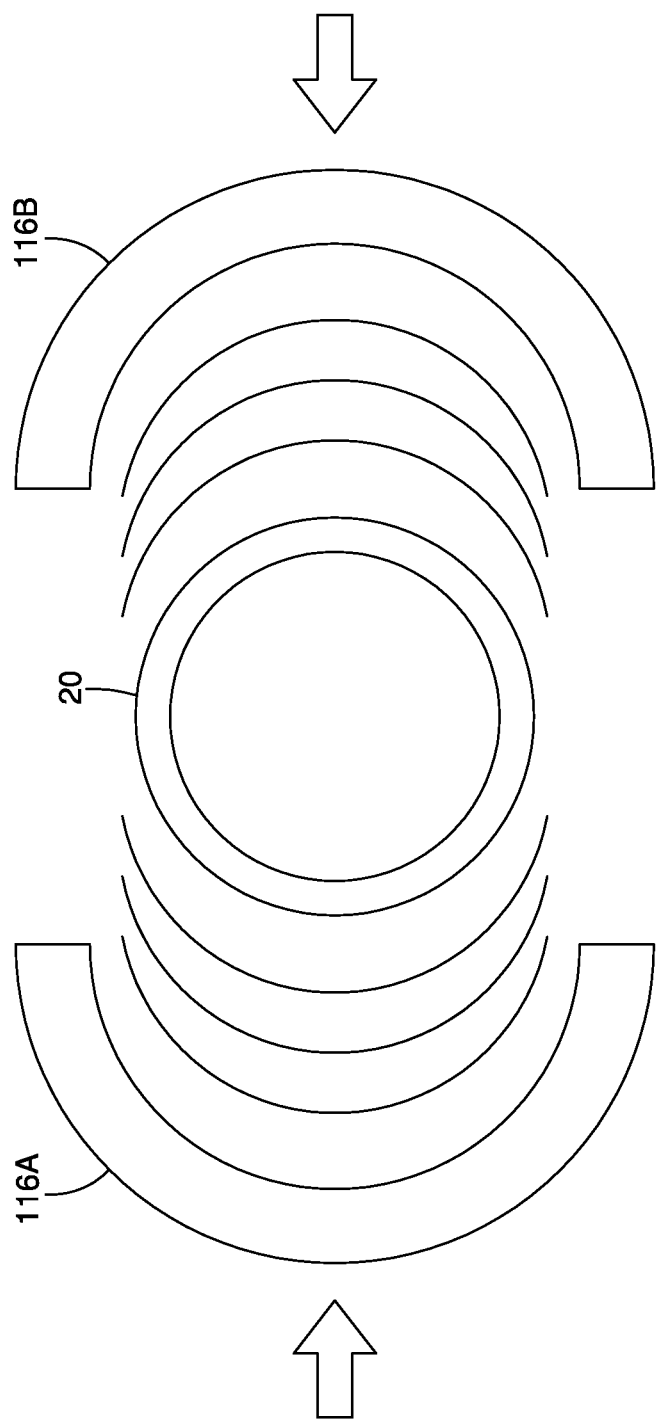
FIG. 6 is a schematic diagram of the transducers of the modified 3D printing system sending vibration waves towards the printed substrate.

Referring to FIGS. 5 and 6, a modified 3D printing system 110 is illustrated in accordance with an illustrated embodiment. The modified 3D printing system 110 is identical to the 3D printing system 10 except for having modified first and second transducers 116A and 116B that are provided as arrays or C-shaped arrays. That is, the first and second transducers 16A and 16B can be modified to be multi-dimensional array's to apply 360 degree vibration waves to the printed substrate 20, as seen in FIG. 6. Further, while the 3D printing system 10 of the illustrated embodiment is described as including first and second transducers 16A and 16B, and the modified 3D printing system 110 is described as having modified first and second transducers 116A and 116B it will be apparent to those skilled in the 3D printing field from this disclosure that the 3D printing system 10 can be provided with a single array of transducers on one robotic arm, or can be provided in several different robotic arms 34 and 36.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a tank of a 3D printing system. Accordingly, these terms, as utilized to describe the present invention should be interpreted relative to a tank of the 3D printing system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A 3D printing system comprising:
   a tank containing a liquid photopolymer resin, the tank including an optically transparent window through which light is configured to pass;
   a rigid base on which a printed substrate is produced from the liquid photopolymer resin as the rigid base moves with respect to the tank;
   a light source configured to emit the light through the optically transparent window of the tank to form the printed substrate on the rigid base;
   a transducer disposed in the liquid photopolymer resin in the tank and movably supported with respect to the tank, the transducer being configured to emit a vibration wave toward the optically transparent window to facilitate flow of the liquid photopolymer resin; and
   an electronic controller programmed to control a position between the transducer and the printed substrate.

2. The 3D printing system according to claim 1, further comprising
   a detector configured to detect the position of the transducer with respect to the printed substrate as a distance between the printed substrate and a bottom wall of the tank changes during printing.

3. The 3D printing system according to claim 2, wherein the electronic controller is programmed to control the position of the transducer based on a location and shape of a printed substrate layer that is closest to the bottom wall of the tank.

4. The 3D printing system according to claim 3, wherein the detector detects an angular position of the transducer with respect to a printed substrate layer that is closest to a bottom wall of the tank.

5. The 3D printing system according to claim 4, wherein the electronic controller is programmed to maintain a predetermined angular position between the transducer and the printed substrate layer that is closest to the bottom wall.

6. The 3D printing system according to claim 5, wherein the predetermined angular position between the transducer and the printed substrate layer that is closest to the bottom wall is 90 degrees.

7. The 3D printing system according to claim 3, wherein the detector detects a distance between the transducer and a printed substrate layer that is closest to the bottom wall.

8. The 3D printing system according to claim 7, wherein the electronic controller is programmed to maintain a predetermined distance between the transducer and the printed substrate layer that is closest to the bottom wall.

9. The 3D printing system according to claim 8, wherein the predetermined distance between the transducer and the printed substrate layer that is closest to the bottom wall is between 1 to 3 millimeters.

10. The 3D printing system according to claim 9, wherein the transducer is a first transducer and the 3D printing system further comprises a second transducer that is movably supported with respect to the tank, the second transducer being configured to emit a vibration wave toward the optically transparent window from a direction that is substantially diametrically opposite from the first transducer, the second transducer being disposed in the liquid photopolymer resin in the tank.

11. The 3D printing system according to claim 10, wherein
    the detector is further configured to detect a position of the second transducer with respect to the printed substrate as the distance between the printed substrate and the bottom wall of the tank changes during printing.

12. The 3D printing system according to claim 11, wherein the electronic controller is further programmed to control the position between the second transducer and the printed substrate.

13. The 3D printing system according to claim 12, wherein
the detector detects an angular position of the second transducer with respect to the printed substrate layer that is closest to the bottom wall of the tank.

14. The 3D printing system according to claim 13, wherein
the electronic controller is programmed to maintain a predetermined angular position between the second transducer and the printed substrate layer that is closest to the bottom wall.

15. The 3D printing system according to claim 14, wherein
the predetermined angular position between the second transducer and the printed substrate layer that is closest to the bottom wall is 90 degrees.

16. The 3D printing system according to claim 12, wherein
the detector detects a distance between the second transducer and the printed substrate layer that is closest to the bottom wall.

17. The 3D printing system according to claim 16, wherein
the electronic controller is programmed to maintain a predetermined distance between the second transducer and the printed substrate layer that is closest to the bottom wall.

18. The 3D printing system according to claim 17, wherein
the predetermined distance between the second transducer and the printed substrate layer that is closest to the bottom wall is between 1 to 3 millimeters.

\* \* \* \* \*